T. DALE.
Walking Planter.
No. 105,314. Patented July 12, 1870.
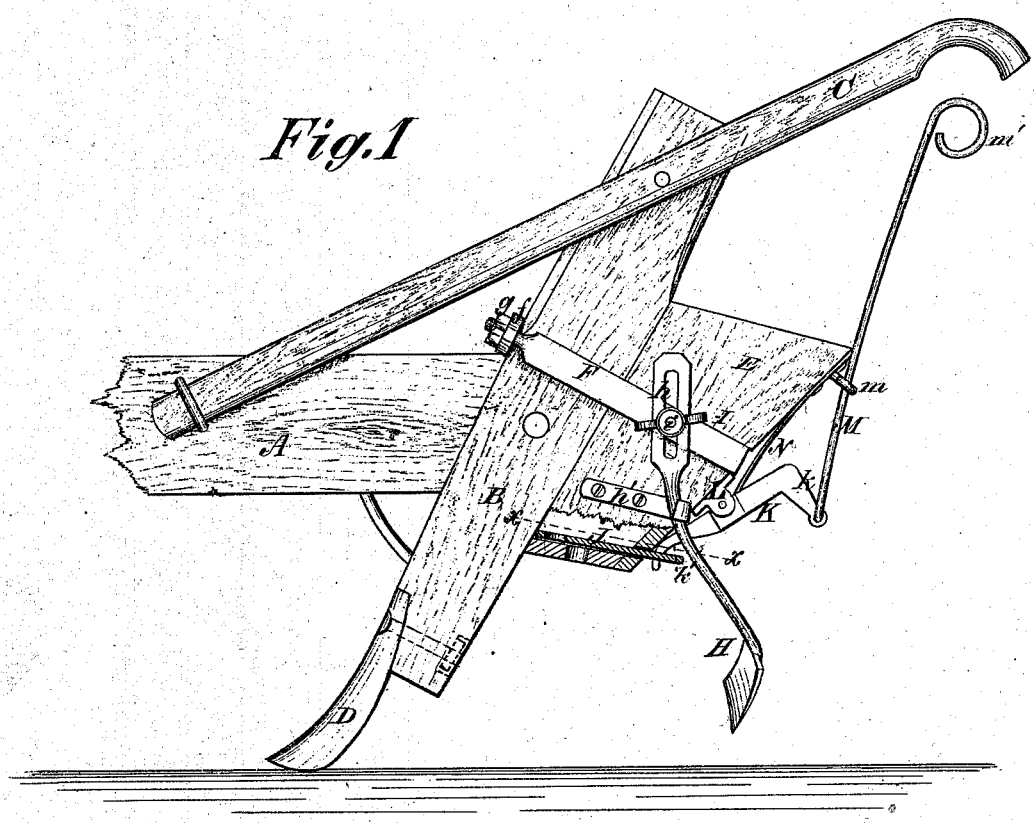
*Fig.1*
*Fig.2*
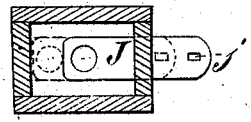
Witnesses:-
Inventor:-

United States Patent Office.

THOMAS DALE, OF RUSSELLVILLE, KENTUCKY.

Letters Patent No. 105,314, dated July 12, 1870.

IMPROVEMENT IN CORN-PLANTERS.

The Schedule referred to in these Letters Patent and making part of the same.

*To all whom it may concern:*

Be it known that I, THOMAS DALE, of Russellville, in the county of Logan and State of Kentucky, have invented certain new and useful Improvements in Corn-Planters, of which the following is a full, clear, and exact description.

My invention relates to that class of machines in which a seed-hopper is attached in rear of a common plow; and The improvements herein claimed consist—

First, in attaching a seed-box or hopper to the stock of a shovel-plow, by a yoke embracing the hopper and stock, and secured in position above the beam in front of the stock, as hereinafter set forth.

Second, in the combination of the plow, the hopper, the yoke, and a covering-plow, having a vertical adjustment, as hereinafter set forth.

Third, in the combination of the hopper secured in rear of the plow-stock, a horizontally reciprocating slide, slotted for the passage of the seed from the hopper, an elbow-lever, pivoted at the back of the hopper, and worked by a rod projecting upward to near the plow-handle and attached to one end of the lever, the other end of which works in a slot in the seed-slide, and a spring bearing against the lever above its pivot, these parts being constructed to operate as hereinafter set forth.

In the accompanying drawing—

Figure 1 represents a view in elevation of one side of my improved planter, with the lower part of the hopper partly broken away, and Figure 2, a section through the hopper at the line x x of fig. 1.

A represents the beam,

B the stock,

C one of the handles, and

D the furrow-opener or shovel of an ordinary shovel-plow.

To the stock B a hopper, E, is attached by a metal yoke, F, having a screw cut upon each of its ends, which embraces the hopper about its center, and is secured in place by a cross-plate, *f*, which fits upon the ends of the yoke, and crosses the stock above the beam, and by nuts *g*, which work upon the ends of the yoke and draw it tightly against the hopper, at the same time clamping the plate *f* against the stock. By this mode of attaching the hopper to the stock a firm connection between the two is accomplished, and the hopper is easily detached, so that the plow may be used alone when desired.

A covering-plow, H, having a slotted shank, *h*, is secured upon a bolt, *i*, projecting from the yoke F, at the side of the hopper.

The bolt *i* has a screw cut upon it to receive a thumb-screw, I.

A support, *h'*, near the lower end of the hopper, braces the coverer. By this arrangement the coverer may be adjusted up or down, so as to turn more or less earth.

The hopper has an opening in the bottom, and is provided with a perforated slide, J, which moves through a slot in the back of the hopper.

An elbow-lever, K, pivoted in a bracket, L, upon the hopper, has attached to its upper arm *k* a rod, M, which passes through a guide-loop, *m*, upon the hopper, and terminates in a loop, *m'*, just below the right handle of the plow.

The long arm *k'* of the lever K enters a slot, *j*, in the slide J.

A spring, N, secured upon the hopper, bears upon the lever K above its pivot. This spring might be a spiral one.

The operation of my planter is as follows:

The coverer is adjusted to turn the desired quantity of earth; the leading plow D turns the furrow to receive the seeds, the requisite number of which is allowed to pass from the hopper at the proper time by the driver, who jerks the rod M to move the lever K, and draw out the slide J until its perforation comes over the hole in the hopper. When the rod is released by the driver, the spring N returns the slide to its original position to shut off the flow of the seed. The coverer H turns the loose earth at the side of the furrow upon the seed, covering them deeply or lightly, according to its adjustment.

I do not claim, broadly, combining a seeding-machine, or a coverer with a plow.

I claim as my invention—

1. The combination of the plow, the hopper, and the yoke, all these parts being constructed to operate as set forth.

2. The combination of the plow, the hopper, the yoke, and the adjustable coverer, all these parts being constructed to operate substantially as set forth.

3. The combination of the plow, the hopper attached to the stock, the reciprocating slide, the elbow-lever, the operating-rod, and the spring, all these parts being constructed to operate substantially as set forth.

In testimony whereof I have hereunto subscribed my name.

THOMAS DALE.

Witnesses:
G. T. SWAIN,
F. A. McCALLEN.